R. SCHILLING.
CAN FILLING MECHANISM.
APPLICATION FILED OCT. 5, 1909.
952,145.
Patented Mar. 15, 1910.
2 SHEETS—SHEET 2.
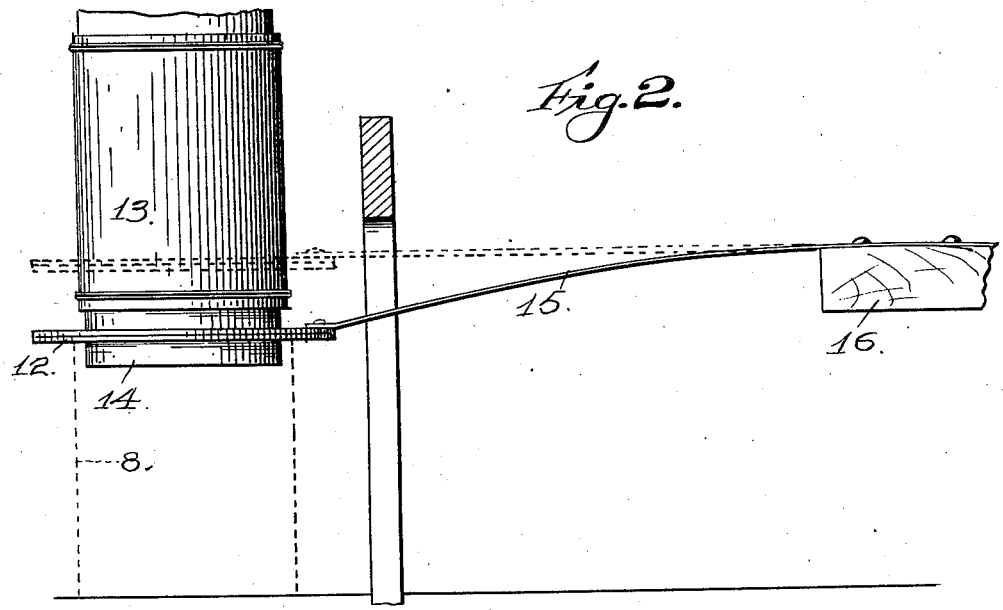
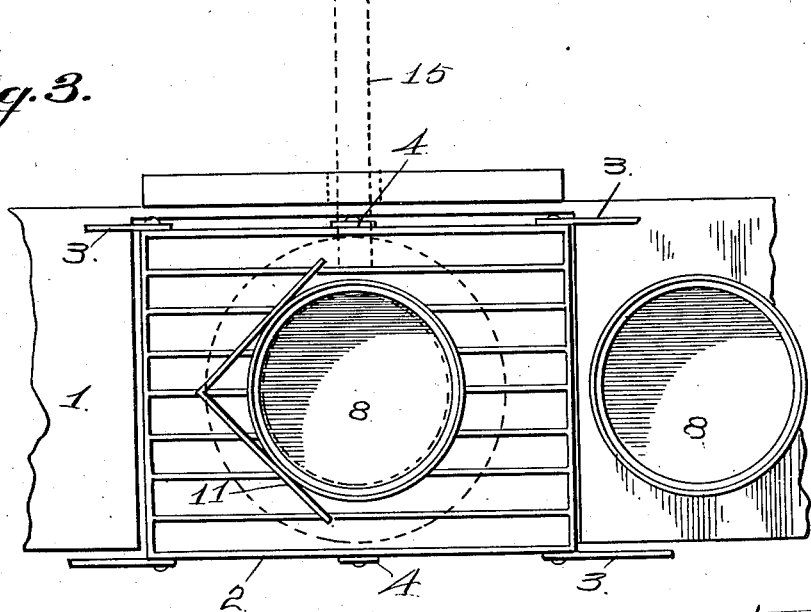
Witnesses
Arthur L. Lee
S. Constine
Inventor
Rudolph Schilling
by N. A. Acker
his atty.

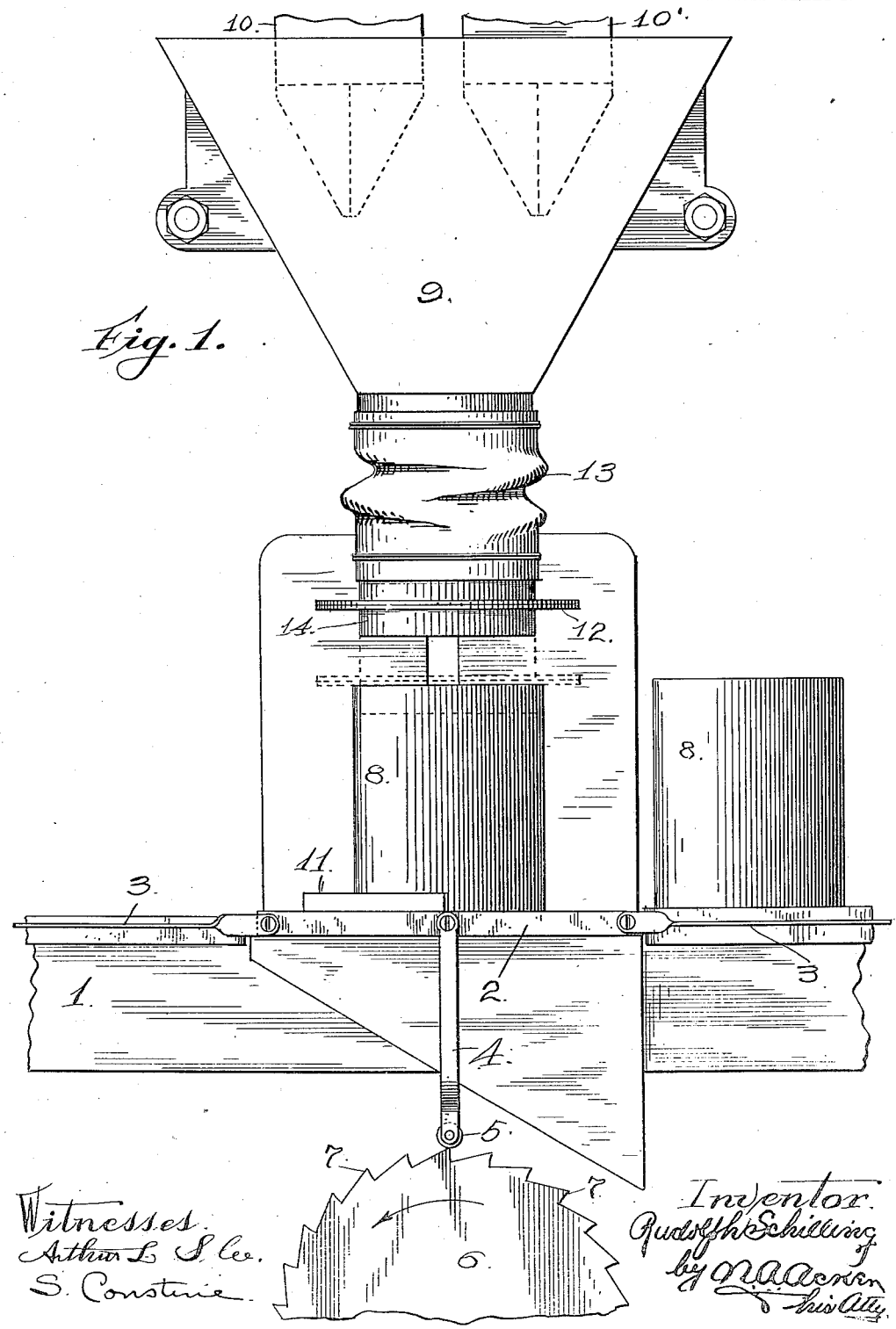

UNITED STATES PATENT OFFICE.

RUDOLPH SCHILLING, OF OAKLAND, CALIFORNIA.

CAN-FILLING MECHANISM.

952,145.  Specification of Letters Patent.  Patented Mar. 15, 1910.

Application filed October 5, 1909. Serial No. 521,068.

*To all whom it may concern:*

Be it known that I, RUDOLPH SCHILLING, a citizen of the United States, residing at Oakland, in the county of Alameda and State of California, have invented certain new and useful Improvements in Can-Filling Mechanism, of which the following is a specification.

The hereinafter described invention is designed for use more particularly in connection with automatic mechanism for weighing and delivering baking powder and similar dry commodities into packages to be filled; the object of the invention being to expedite the work of filling the packages, to reduce the cost incident thereto, and avoid the waste of material which takes place with such machines as at present constructed and placed into use.

To comprehend the invention reference should be had to the accompanying sheet of drawings, wherein—

Figure 1 is a front view of the improved filling mechanism as applied to an ordinary automatic weighing machine for baking powder, the ratchet wheel for operating the vibratory platform for the can or package to be filled being partly broken away, said view disclosing the closing or cover cap for the can or package in raised position, its lowered position and the relation thereof to the can or package when lowered being illustrated in dotted lines. Fig. 2 is a detail side view of the closing or cover cap and its flexible connection with the receiving hopper of the weighing machine, said view illustrating the spring arm for holding the closing cover or cap in raised position and restoring the same to such position after the filling of the can or package. Fig. 3 is a plan view of the features illustrated in Fig. 1 of the drawings, the weighing mechanism and the receiving hopper thereof being removed.

In the drawings, the numeral 1 is used to designate any suitable form of a supporting table, and 2 a vibrating section or platform connected and held thereto by means of the spring rods 3. From this vibrating section or platform 2 depends a rod 4, carrying at its lower end a roll 5, which roll rides on the periphery of a ratchet wheel 6, driven by any suitable means. As rotation is given to the ratchet wheel 6, the roll 5, riding on the teeth 7 thereof, imparts, through the medium of the spring rod connections 3, a vibratory action to the section or platform 2, on which rests the can or package 8 to be filled.

The vibratory section or platform 2 is located beneath the receiving hopper, funnel, chute or runway 9, which receives the material to be delivered into the can or package 8 from the cups 10—10′ of the weighing machine. On the upper face of the vibratory section or platform 2 the gage 11 is arranged, against which the can or package to be filled abuts, when slipped or placed by the operator thereon, the said gage centering the can or package with the vertically movable closing or cover cap 12. This cap is connected to the lower contracted discharge end of the hopper 9, by means of an elastic tube 13, and from the under face of the cover cap projects the tubular guide extension 14, which, when the cover cap is forced downwardly, fits within the open end of the can or package 8 to be filled, the open end of the said can or package being then held closed by the under face of the cover cap bearing thereon, as disclosed by dotted lines in Fig. 1 of the drawings. It is required that the open end of the can or package be closed during the filling thereof with baking powder or similar light material, else the same would by reason of its extreme lightness be forced outwardly by the air displaced from within the can or package, as the material is forced therein. The said cover cap 12 is normally held upwardly by means of a suitable spring, in the present case illustrated as a spring rod 15 rearwardly extended therefrom, which rod is connected at its inner end to a suitable support 16.

The cups 10—10′ receive the material to be delivered into the cans or packages from a suitable source of supply, and, as customary in automatic weighing and filling machines for baking powder, the said cup automatically opens when a given amount of material has been received therein and discharges the load thereof into the receiving hopper 9. Inasmuch as the means for filling the cups and alternately opening the same to discharge the weighed load therefrom are well understood and form no portion of the present invention, illustration of said means is believed unnecessary.

It is required that the connection between the cover cap 12 and the receiving hopper 9 of the weighing apparatus be of an elastic nature, for if of a rigid character, the vibrations of the section or platform 2 would be transmitted to the weighing mechanism and thus interfere with the same so far as relates to accuracy of the weighing features for the material.

In carrying out the operation of filling a can or package, the operator removes one of the packages from the receiving portion of the table 1 and slips the same onto the vibratory section or platform 2 until it bears against the gage 11, when the cover cap 12 is depressed to close the open end of the package and held thereagainst until the same is filled. While the can or package is thus held closed, one of the cups 10—10' discharges its load into the hopper 9, from whence it falls through the elastic tube 13 into the open end of the held can or package, the vibratory motion imparted to the supporting section or platform 2 and to the held can or package, causing the material to fall from within the elastic tube 13. Without the vibratory action given to the supporting section or platform 2, the tendency of the material, due to the lightness thereof, would be to cling to the inner wall of the elastic tube 13 and thus gradually clog the same. Again, the vibration of the supporting section or platform 2 causes the light material entering the can or package to firmly settle and pack therein, and to gradually release the air from within the held can or package. After the load discharged from the cup of the weighing machine has entered the can or package to be filled, the operator releases the cover cap 12, when the same is raised or restored to normal position to release the filled can or package by means of the pressure of the spring 15. The operator then removes the filled can or package, and places an empty one on the vibratory section or platform, and repeats the operations previously describel.

Heretofore in connection with the operation of filling cans or packages with baking powder or similar light dry material from an automatic weighing machine, the custom has been to insert within the can or package as conveyed toward the filling machine, a receiving tube, through which, on the can or package being placed beneath the discharge hopper or chute of the machine, the material entered the can or package, which tube, after the can or package had been filled and removed from the filling machine by the operator had to be withdrawn from within the filled can or package, the withdrawing of which, owing to the lightness of the material, caused the displacement and waste of a small quantity of material, which waste amounts to considerable in connection with thousands of cans. By the described invention for conveying the material to the cans or packages for the filling thereof, the time and expense heretofore lost in being required to insert within the empty cans or packages the filling or guide tube and for withdrawing the same from the cans or packages when filled are saved, and additionally there is saved the loss in material which results from the withdrawing of the filling or guide tubes from within the filled cans or packages.

Having thus described the invention what is claimed as new and desired to be protected by Letters Patent is:—

1. In an apparatus for the described purpose, the combination with a receiving hopper, of an elastic tube connected thereto, a cover cap secured to the lower end of said tube, a supporting platform for a can or package to be filled, and means for vibrating the said platform.

2. In an apparatus for the described purpose, the combination with a receiving hopper, an elastic tube connected to the discharge end thereof, a spring held cover cap carried by the lower end of the elastic tube, a supporting platform for a can or package to be filled, and means for vibrating the said platform.

3. In an apparatus for the described purpose, the combination with a receiving hopper, an elastic guide section connected to the discharge end thereof, a device carried thereby for closing the end of a can or package to be filled, a spring held platform for the cans or packages, and means for imparting vibration to the said platform.

4. In an apparatus for the described purpose, the combination with an elastic guide tube for delivering material into the can or package to be filled, of a vibratory platform for the cans or packages, and means for vibrating the said platform.

5. In an apparatus for the described purpose the combination with an elastic guide tube for delivering material into the can or package to be filled, a vibratory platform for the cans or packages, a ratchet wheel for actuating the same, and connection between said wheel and the vibratory platform.

6. In an apparatus for the described purpose, the combination with the receiving hopper, an elastic guide tube connected to the discharge end thereof for delivering material into the can or package to be filled, means for normally holding the elastic tube in a raised position, a platform for the cans or packages, and mechanism for imparting vibration to the said platform.

7. In an apparatus for the described purpose, the combination with the receiving hopper, an elastic guide tube connected to the discharge end thereof for conveying material into the can or package to be filled, a cover cap secured to the lower end portion of the guide tube for closing the open end of the can or package to be filled, a spring for normally holding the elastic guide tube in raised position to maintain the cover cap clear of the open end of a can, and a vibratory supporting platform for the cans or packages.

8. In an apparatus for the described purpose, the combination with the receiving hopper, a yielding guide connection extended from the discharge end thereof, a cover cap carried thereby for closing the open end of a can or package to be filled, a supporting platform for the can or package, a gage device thereon for centering the can or package relative to the guide connection, and means for imparting vibration to the said platform.

In testimony whereof I have signed my name to this specification in the presence of two subscribing witnesses.

RUDOLPH SCHILLING.

Witnesses:
  N. A. ACKER,
  D. B. RICHARDS.